(12) United States Patent
Ahn et al.

(10) Patent No.: US 12,435,226 B2
(45) Date of Patent: Oct. 7, 2025

(54) PRINTED BOARD

(71) Applicant: LG CHEM, LTD., Seoul (KR)

(72) Inventors: Yeon Seon Ahn, Daejeon (KR); Sung Jin Shin, Daejeon (KR); Je Hyuk Yoo, Daejeon (KR); Tae Yong Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 215 days.

(21) Appl. No.: 18/013,876

(22) PCT Filed: Aug. 12, 2021

(86) PCT No.: PCT/KR2021/010755
§ 371 (c)(1),
(2) Date: Dec. 29, 2022

(87) PCT Pub. No.: WO2022/035264
PCT Pub. Date: Feb. 17, 2022

(65) Prior Publication Data
US 2023/0287225 A1    Sep. 14, 2023

(30) Foreign Application Priority Data

Aug. 14, 2020  (KR) .................. 10-2020-0102746

(51) Int. Cl.
*C09D 11/037* (2014.01)
*B32B 7/12* (2006.01)
(Continued)

(52) U.S. Cl.
CPC .............. *C09D 11/037* (2013.01); *B32B 7/12* (2013.01); *B32B 17/10* (2013.01); *B32B 27/36* (2013.01);
(Continued)

(58) Field of Classification Search
CPC ..... C09D 11/037; C09D 11/104; C09D 11/03; C09D 11/033; C09D 11/10; B32B 7/12;
(Continued)

(56) References Cited

U.S. PATENT DOCUMENTS

2004/0187732 A1* 9/2004 Roman ............ B32B 17/10761
347/100
2014/0000942 A1  1/2014 Seong et al.
(Continued)

FOREIGN PATENT DOCUMENTS

CN    1548604 A    11/2004
CN    101389481 A    3/2009
(Continued)

OTHER PUBLICATIONS

[NPL-1] Iwamoto et al. (JP 2011-252063 A), Dec. 15, 2011 (EPO machine translation to English). (Year: 2011).*
(Continued)

*Primary Examiner* — Donald M Flores, Jr.
(74) *Attorney, Agent, or Firm* — Bryan Cave Leighton Paisner LLP

(57) ABSTRACT

A printed board, a screen-printing ink, and a screen-printing method are provided. The printed board comprises a printed pattern and/or printed line which comprises a polymer binder and a fluorine-based surfactant, has excellent thickness uniformity and straightness, has no edge top defect, and is not damaged even when formed on a repeatedly folded substrate.

5 Claims, 3 Drawing Sheets

(51) Int. Cl.
*B32B 17/10* (2006.01)
*B32B 27/36* (2006.01)
*B41M 1/12* (2006.01)
*C09D 11/104* (2014.01)

(52) U.S. Cl.
CPC ............ B41M 1/12 (2013.01); C09D 11/104 (2013.01); *B32B 2255/10* (2013.01); *B32B 2255/26* (2013.01); *B32B 2307/4023* (2013.01)

(58) Field of Classification Search
CPC ..... B32B 17/10; B32B 27/36; B32B 2255/10; B32B 2255/26; B32B 2307/4023; B41M 1/12; B41M 1/34; B41N 1/24; C08L 67/00; C09J 201/00
See application file for complete search history.

(56) References Cited

U.S. PATENT DOCUMENTS

| | | | |
|---|---|---|---|
| 2015/0044437 A1 | 2/2015 | Landa et al. | |
| 2016/0222232 A1 | 8/2016 | Landa et al. | |
| 2021/0070082 A1* | 3/2021 | Guo | B41M 5/0011 |

FOREIGN PATENT DOCUMENTS

| | | | | |
|---|---|---|---|---|
| CN | 102471625 A | | 5/2012 | |
| CN | 103131252 A | | 6/2013 | |
| EP | 3447098 A1 | * | 2/2019 | ........... C09D 11/324 |
| JP | S59-182868 A | | 10/1984 | |
| JP | 2004-083719 A | | 3/2004 | |
| JP | 2006307153 A | | 11/2006 | |
| JP | 2007261135 | | 10/2007 | |
| JP | 2011252063 A | * | 12/2011 | ............. B41M 1/10 |
| JP | 2012129343 A | | 7/2012 | |
| JP | 2017-091741 A | | 5/2017 | |
| JP | 2018051872 A | | 4/2018 | |
| JP | 2018-184553 A | | 11/2018 | |
| JP | 2020-044752 A | | 3/2020 | |
| KR | 10-1150952 B1 | | 5/2012 | |
| KR | 20130056598 A | * | 5/2013 | ........... C09D 11/324 |
| KR | 10-1290249 B1 | | 7/2013 | |
| KR | 10-1295450 B1 | | 8/2013 | |
| KR | 10-2014-0047773 A | | 4/2014 | |
| KR | 2014047773 A | * | 4/2014 | ............. C09D 11/10 |
| KR | 10-2017-0115797 A | | 10/2017 | |
| WO | 2014-013986 A1 | | 1/2014 | |
| WO | 2017018202 | | 2/2017 | |

OTHER PUBLICATIONS

[NPL-1] Iwamoto (JP 2011-252063 A); Dec. 15, 2011 (EPO—machine translation to English). (Year: 2011).*
[NPL-2] Kim (KR 2014-047773 A); Apr. 23, 2014 (EPO—machine translation to English). (Year: 2014).*
[NPL-3] Kim et al. (KR 2013-0056598 A); May 30, 2013 (EPO machine translation to English). (Year: 2013).*

* cited by examiner

[FIG. 1]
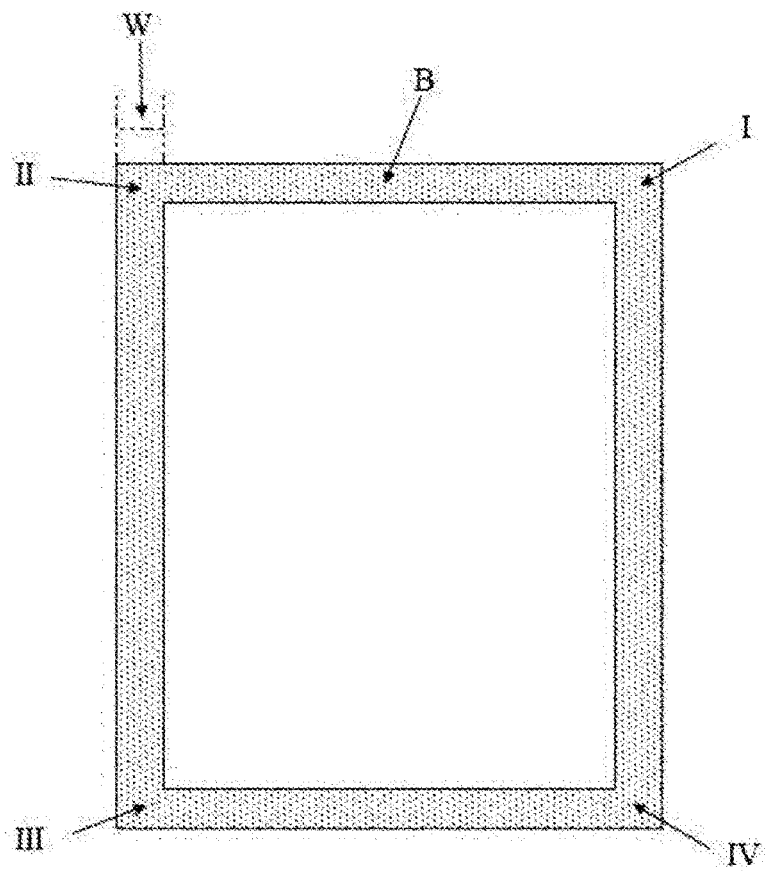
[FIG. 2]
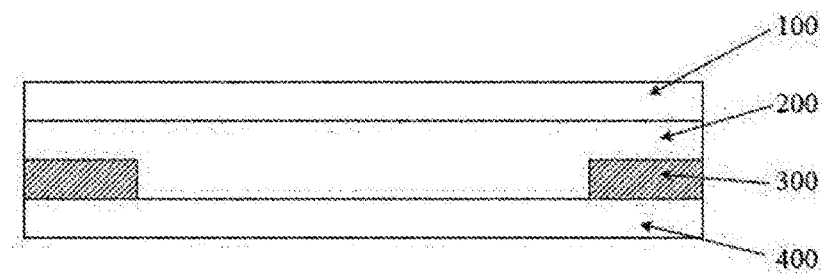

[FIG. 3]
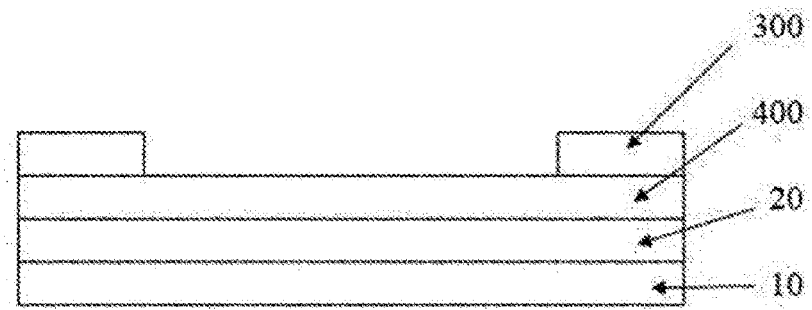
[FIG. 4]
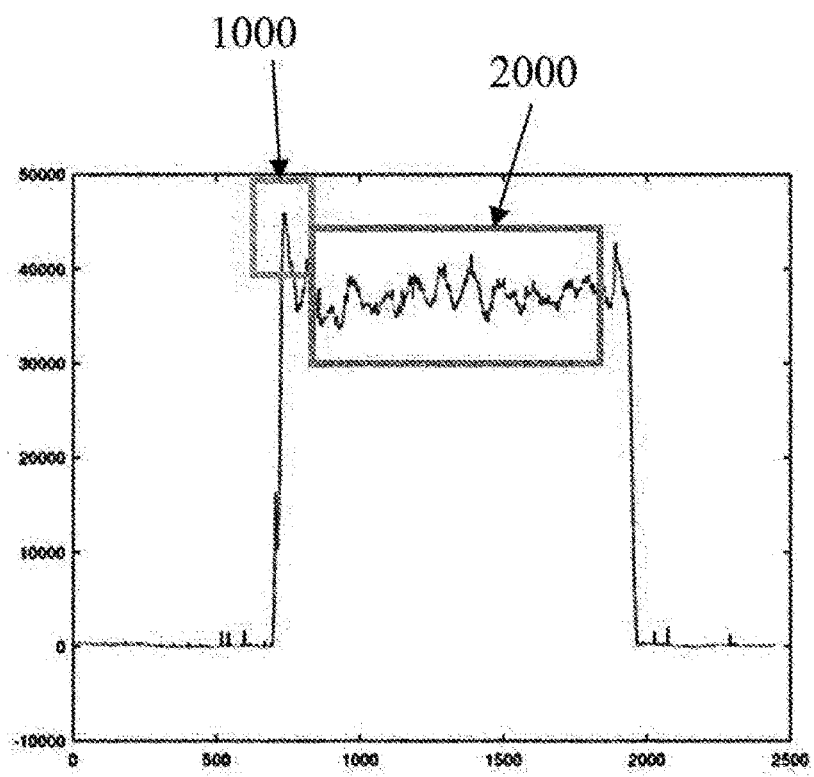

[FIG. 5]
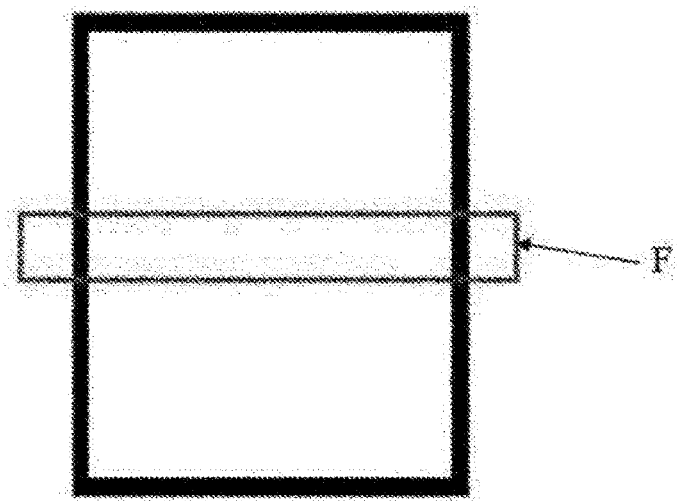
[FIG. 6]
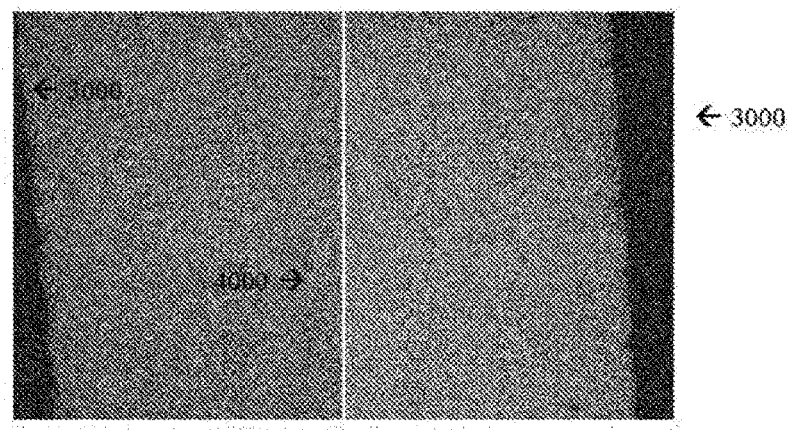

PRINTED BOARD

CROSS CITATION WITH RELATED APPLICATION(S)

This application is a National Stage Application of International Application No. PCT/KR2021/010755, filed on Aug. 12, 2021, which claims priority based on Korean Patent Application No. 10-2020-0102746 filed on Aug. 14, 2020, the disclosure of which is incorporated herein by reference in its entirety.

FIELD OF DISCLOSURE

The present application relates to a printed board, a screen-printing ink, and a screen-printing method.

BACKGROUND

Screen-printing is a printing method in which an ink is applied to a screen mask (printing plate) and pushed with a squeegee, thereby transferring a printed pattern to a base material to be printed.

In the screen-printing process, a drying and/or curing process may be performed after the ink is transferred to a base material to be printed. After being transferred to the base material to be printed, the ink is in a state having a certain degree of fluidity until the drying and/or curing process is completed, so that a spreading phenomenon of the ink may occur. Such ink spreading may deteriorate the thickness uniformity and straightness of the printed pattern, and may cause edge top defects.

Here, the thickness uniformity indicates how uniformly the thickness is formed when the printed pattern is observed from the side, and the straightness indicates how straightly the edges are formed when the printed pattern is observed from the top.

In addition, the edge top defect refers to a defect in which the edge of the pattern protrudes in a shoulder shape when the printed pattern is observed from the side. It is assumed that such an edge top defect occurs as a difference in the solvent evaporation rate at the edge and the center of the transferred pattern occurs when the transferred ink is dried and/or cured, and as a result, the solid content of the ink moves to a region where the solvent evaporation rate is fast, and a deviation in surface tension is induced.

For stable screen-printing, it is necessary to solve such problems.

When the screen-printing is particularly used to form a printed pattern having relatively narrow width and low height, such as a bezel pattern, it is necessary to precisely control such defects at a higher level.

In addition, when a screen-printed pattern such as a bezel pattern is formed on a board to be printed (for example, a cover substrate of a foldable mobile phone, etc.), which is exposed to repeated folding during use, it is required that the printed pattern is stably maintained without being damaged even under repeated folding.

SUMMARY

The present application provides a printed board, a screen-printing ink, and a screen-printing method. The present application can provide a printed board comprising a printed pattern which has excellent thickness uniformity and straightness, has no edge top defect, and is not damaged even when it is formed on a repeatedly folded board to be exposed to repeated folding, and an ink and a printing method capable of forming the printed pattern.

In addition, the present application can exhibit the above advantages even when the printed pattern is formed to have a relatively narrow width and/or height.

In one example, the present application relates to a printed board.

The printed board may comprise, for example, a substrate; and a printed pattern formed on the substrate.

In the present application, the specific types of the printed pattern and the substrate are not particularly limited. According to the present application, the printed pattern may be formed without edge top defects while having excellent thickness uniformity and straightness. In addition, the excellent thickness uniformity and straightness are maintained, and no edge top defect occurs even when the printed pattern is exposed to repeated folding and/or when the printed pattern is formed to have relatively narrow width and/or low height.

Therefore, the printed pattern and the substrate may be all types of printed patterns and substrates requiring the above characteristics.

In one example, the printed pattern may also be a bezel pattern. FIG. 1 is a form of a bezel pattern (B) according to an embodiment of the present disclosure.

The type of the substrate in the printed board is not particularly limited, which may be selected according to the purpose. For example, in one example, the printed board may be a cover laminate for a touch panel, and in this case, a general substrate applied to the manufacture of a cover laminate for a touch panel may be applied as the substrate.

In addition, when the printed board is a cover laminate for a touch panel, the printed board may further comprise a pressure-sensitive adhesive layer or an adhesive layer disposed on the printed pattern and a cover substrate attached by the pressure-sensitive adhesive layer or the adhesive layer.

FIG. 2 illustrates, as an example of such a structure, a printed board comprising a substrate (400), a printed pattern (e.g., a bezel pattern) (300), the pressure-sensitive adhesive layer or adhesive layer (200), and the cover substrate (100).

In the laminate, the types of the substrate, the pressure-sensitive adhesive layer, the adhesive layer and/or the cover substrate are not particularly limited, and known materials may be applied.

The printed pattern may comprise one or more printed lines. The printed line is a unit print layer constituting the printed pattern.

For example, the printed pattern (bezel pattern B) of FIG. 1 comprises a printed line from approximately point I to approximately point II, a printed line from approximately point II to approximately point III, a printed line from approximately point III to approximately point IV, and a printed line from approximately point IV to approximately point I.

Such a printed line may have an approximately straight-line shape. At this time, the straight-line shape may also be a perfectly straight-line shape, or may also be an approximately straight shape. For example, in the present application, when the printed line has straightness to be described below, it may be referred to as a printed line in a straight-line shape even if it is not a perfectly straight-line shape.

The printed line and/or the printed pattern may have excellent thickness uniformity.

For example, the printed line and/or the printed pattern may have thickness uniformity of 0.6 μm or less. The thickness uniformity is the difference between the maximum thickness and the minimum thickness of the central thickness region of the printed line and/or the printed pattern measured in the manner described in Examples to be described below. In another example, the thickness uniformity may be 0.59 µm or less, 0.58 µm or less, 0.57 µm or less, 0.56 µm or less, 0.55 µm or less, 0.54 µm or less, 0.53 µm or less, 0.52 µm or less, 0.51 µm or less, 0.5 µm or less, 0.49 µm or less, 0.48 µm or less, 0.47 µm or less, 0.46 µm or less, 0.45 µm or less, 0.44 µm or less, or 0.43 µm or less or so. The lower limit of the thickness uniformity is not particularly limited because it means that the lower the numerical value, the better the thickness uniformity of the printed line and the printed pattern. For example, in another example, the thickness uniformity may also be about 0 µm or more, 0.1 µm or more, 0.2 µm or more, 0.3 µm or more, or 0.4 µm or more or so.

The printed line and/or printed pattern may not include edge top defects.

For example, the printed line and/or the printed pattern may have an edge top deviation of 0.55 µm or less. The edge top deviation is an absolute value of the difference between the average thickness of the printed line or the printed pattern measured in the manner described in Examples to be described below and the thickness of the edge portion of the printed line or printed pattern having the average thickness. In another example, the edge top deviation may also be 0.54 µm or less, 0.53 µm or less, 0.52 µm or less, 0.51 µm or less, 0.50 µm or less, 0.49 µm or less, 0.48 µm or less, 0.47 µm or less, 0.46 µm or less, 0.45 µm or less, 0.44 µm or less, 0.43 µm or less, 0.42 µm or less, 0.41 µm or less, 0.40 µm or less, 0.39 µm or less, or 0.38 µm or less or so. The lower limit of the edge top deviation is not particularly limited because it means that the lower the numerical value, there is no edge top defect in the printed line and the printed pattern. For example, in another example, the edge top deviation may also be about 0 µm or more, 0.1 µm or more, 0.2 µm or more, or 0.3 µm or more or so.

When the printed line and/or the printed pattern has a straight-line shape, the relevant printed line and/or printed pattern may have excellent straightness. For example, the printed line and/or the printed pattern may have straightness of 50 µm or less. The straightness may be obtained by analyzing the image measured with an optical microscope, thereby taking the distance to the printed area (black) farthest to the outside of the printed area based on the designated center line as (+) and taking the distance to the unprinted area (white) farthest from the inside of the printed area based on the center line as (−), and then using the (+) and (−) average values of two outside and inside parts of the edge area in the printed area, where specific methods are described in Examples. In another example, the straightness may also be 48 µm or less, 46 µm or less, 44 µm or less, 42 µm or less, 40 µm or less, 38 µm or less, 36 µm or less, 34 µm or less, 32 µm or less, 30 µm or less, 28 µm or less, or 26 µm or less or so. As for the straightness value, the lower the value, it indicates better straightness, so that the lower limit is not particularly limited. In one example, the straightness may also be 5 µm or more, 10 µm or more, 15 µm or more, or 20 µm or more or so.

The width (e.g., in the case of a bezel pattern, W in FIG. 1) of such a printed pattern or printed line may be in a range of 0.1 mm to 10 mm. In another example, the width may be further adjusted within the range of 0.5 mm or more, 1 mm or more, or 1.5 mm or more and/or within the range of 9 mm or less, 8 mm or less, 7 mm or less, 6 mm or less, 5 mm or less, 4 mm or less, or 3 mm or less.

The height (e.g., height of the bezel pattern) of such a printed pattern or the printed line may be in a range of 0.5 µm to 10 µm. In another example, the height may also be further adjusted within the range of 1 µm or more, 1.5 µm or more, 2 µm or more, or 3.5 µm or more and/or within the range of 9 µm or less, 8 µm or less, 7 µm or less, 6 µm or less, or 5 µm or less.

In the present application, even when the width and/or height of the printed pattern or printed line is formed in the relatively narrow width and/or low height within the above ranges, it is possible to form the printed pattern and/or the printed line having the desired characteristics (excellent straightness and thickness uniformity, absence of edge top defects, and excellent adhesion and durability).

The printed pattern and/or printed line as above may be formed by applying an ink to be described below, and further applying a printing method to be described below.

For example, the printed pattern and/or the printed line formed using the ink to be described below may comprise at least a portion of the components of the ink.

For example, the printed pattern and/or the printed line may comprise at least a polymer binder and at least a fluorine-based surfactant.

Specific types of the polymer binder and the fluorine-based surfactant will be described in the description of the ink to be described below.

The polymer binder and the fluorine-based surfactant in the printed pattern and/or the printed line have also approximately similar contents to the contents in the ink to be described below.

For example, in the printed pattern and/or printed line, the fluorine-based surfactant may be included in an amount of 0.25 to 2.5 parts by weight relative to 100 parts by weight of the polymer binder, and in another example, this ratio may be further adjusted within the range of 0.26 parts by weight or more, 0.27 parts by weight or more, 0.28 parts by weight or more, 0.29 parts by weight or more, 0.3 parts by weight or more, 0.35 parts by weight or more, 0.4 parts by weight or more, 0.45 parts by weight or more, 0.5 parts by weight or more, 0.55 parts by weight or more, 0.6 parts by weight or more, 0.65 parts by weight or more, 0.7 parts by weight or more, 0.75 parts by weight or more, 0.8 parts by weight or more, 0.85 parts by weight or more, 0.9 parts by weight or more, 0.95 parts by weight or more, 1 part by weight or more, 1.2 parts by weight or more, 1.4 parts by weight or more, 1.6 parts by weight or more, 1.8 parts by weight or more, or 2 parts by weight or more and/or within the range of 2.4 parts by weight or less, 2.3 parts by weight or less, 2.2 parts by weight or less, 2.1 parts by weight or less, 2 parts by weight or less, 1.8 parts by weight or less, 1.6 parts by weight or less, 1.4 parts by weight or less, 1.2 parts by weight or less, 1 part by weight or less, 0.95 parts by weight or less, 0.9 parts by weight or less, 0.85 parts by weight or less, 0.8 parts by weight or less, 0.75 parts by weight or less, 0.7 parts by weight or less, 0.65 parts by weight or less, 0.6 parts by weight or less, 0.55 parts by weight or less, 0.5 parts by weight or less, 0.45 parts by weight or less, 0.4 parts by weight or less, 0.35 parts by weight or less, or 0.3 parts by weight or less.

The printed pattern and/or the printed line may equally comprise components of the ink to be described below, and the ratio thereof may also be adjusted within the range mentioned in the description of the ink.

For example, the printed pattern and/or the printed line may comprise, as an additional component, a colorant for imparting an optical density, or the like. At this time, specific types of the applied colorant are the same as those described in the ink section below. Such a colorant may be applied in a ratio of 20 to 90 parts by weight relative to 100 parts by weight of the polymer binder, but this may be adjusted in consideration of the desired optical density. In order to properly secure the desired physical properties, the ratio may be further adjusted, for example, within the range of 25 parts by weight or more, 30 parts by weight or more, 35 parts by weight or more, 40 parts by weight or more, 45 parts by weight or more, 50 parts by weight or more, 55 parts by weight or more, 60 parts by weight or more, 65 parts by weight or more, 70 parts by weight or more, 75 parts by weight or more, or 80 parts by weight or more and/or within the range of 85 parts by weight or less, 80 parts by weight or less, 75 parts by weight or less, 70 parts by weight or less, 65 parts by weight or less, 60 parts by weight or less, 55 parts by weight or less, 50 parts by weight or less, 45 parts by weight or less, or 40 parts by weight or less.

The printed pattern and/or the printed line may comprise, as an additional component, a solvent component included in the ink to be described below. Such a solvent component is usually removed by volatilization or the like during the printing process, but may also be present in a trace amount in the printed pattern and/or printed line.

Therefore, the printed pattern and/or the printed line may comprise a compound of Formula 1 described in the following ink section.

The printed pattern and/or printed line is formed by the ink, but the solvent component (e.g., the compound of Formula 1) contained in the ink during the formation process may be in a state of being removed by evaporation or the like, so that the ratio of the polymer binder in the printed pattern and/or printed line may be different from the ratio in the ink.

For example, the ratio of the polymer binder in the printed pattern and/or the printed line may be in a range of about 50 to 95 weight %. In another example, the ratio may be further adjusted within the range of about 55 weight % or more, 60 weight % or more, 65 weight % or more, 70 weight % or more, 75 weight % or more, 80 weight % or more, 85 weight % or more, or 90 weight % or more and/or within the range of 90 weight % or less, 85 weight % or less, 80 weight % or less, 75 weight % or less, 70 weight % or less, 65 weight % or less, 60 weight % or less, or 55 weight % or less.

Hereinafter, an ink applied to the formation of the printed pattern and/or printed line will be described. The ink may be a screen-printing ink. Thus, the ink may be applied to a screen-printing process.

The ink of the present application comprises at least a polymer binder and a fluorine-based surfactant. The ink of the present application may be an ink type cured by drying (hereinafter, it may be referred to as a dry curing type or a thermosetting type). Here, the category of the ink type cured by drying does not include the ink of the type cured by irradiation of energy rays such as ultraviolet rays.

In the present application, the type of the applicable polymer binder is not particularly limited. In the industry, various polymer binders that can be applied to screen-printing inks to exhibit appropriate viscosity characteristics and appropriate adhesion and durability to a substrate to be printed are known, and all these known polymer binders may be used in the present application.

Such a polymer binder may be exemplified by polyesters or various modified polyester, such as polyester, urethane-modified polyester, epoxy-modified polyester and acrylic-modified polyester, vinyl chloride-vinyl acetate copolymer resin, butyral resin, polyether urethane resin, polyester urethane resin, polycarbonate urethane resin, epoxy resin, phenol resin, acrylic resin, polyamide, polyamideimide, polyolefin, chlorinated polyolefin, chlorinated rubber, melamine resin, urea resin, modified cellulose resin such as ethyl cellulose resin, nitrocellulose resin, cellulose acetate butyrate (CAB) and cellulose acetate propionate (CAP), rosin resin, maleic acid resin, natural resin and/or alkyd resin, and the like.

In the present application, among these known binders, binders of polyester series such as polyesters or various modified polyesters, such as polyesters, urethane-modified polyesters, epoxy-modified polyesters, and acrylic-modified polyesters, can effectively achieve the desired characteristics in combination with fluorine-based surfactants, but in the present application, the applicable binder is not limited thereto.

The polymer binder may be included in a ratio of about 20 to 40 weight % in the ink. In another example, the ratio may be about 21 weight % or more, about 22 weight % or more, about 23 weight % or more, about 24 weight % or more, or about 25 weight % or more, or may also be about 39 weight % or less, about 38 weight % or less, about 37 weight % or less, about 36 weight % or less, or about 35 weight % or less or so. When the fluorine-based surfactant to be described below is combined in an appropriate ratio with the ink comprising the polymer binder under such a ratio, the flow characteristics (viscosity, thixotropy, etc.) of the ink are appropriately adjusted, and solid content movement and surface tension in the drying and/or curing process of the ink are controlled to an appropriate level, whereby a printed pattern and/or a printed line having excellent thickness uniformity and straightness, no edge top defect, and no damage even during repeated folding can be formed.

The ink further comprises a fluorine-based surfactant. When such a fluorine-based surfactant is included in an appropriate ratio, it appropriately adjusts the flow characteristics (viscosity, thixotropy, etc.) of the ink, and controls the solid content movement and surface tension in the drying and/or curing process of the ink, whereby it is possible to form a printed pattern having excellent thickness uniformity and straightness, no edge top defect, and no damage even during repeated folding.

The type of fluorine-based surfactant is not particularly limited, and for example, fluorine-based surfactants known as fluoroalkyl carboxylates, fluoroalkyl phosphates, fluoroalkyl sulfonates, fluoroalkyl ethylene oxide derivatives, or fluoroalkyl ammonium salts may be used. As the fluorine-based surfactant, an ionic surfactant or a nonionic surfactant may be applied, and a nonionic surfactant may be appropriately applied. Such a surfactant is known as DIC's F-251, F-444, F-477, F-510, F-552, F-553, F-554, F-555, F-556, F-557, F-558, F-559, F-560, F-561, F-562, F-563, F-565, F-567, F-568, F-569, F-570 or F-571, and the like.

Such a fluorine-based surfactant may be included in the ink in an amount of 0.25 to 2.5 parts by weight relative to 100 parts by weight of the polymer binder. Under such a ratio, the flow characteristics (viscosity, thixotropy, etc.) of the ink are appropriately adjusted, and solid content movement and surface tension in the drying and/or curing process of the ink are controlled to an appropriate level, whereby a printed pattern and/or a printed line having excellent thickness uniformity and straightness, no edge top defect, and no damage even during repeated folding can be formed.

In another example, the ratio of the surfactant may be 0.26 parts by weight or more, 0.27 parts by weight or more, 0.28 parts by weight or more, 0.29 parts by weight or more, 0.3 parts by weight or more, 0.35 parts by weight or more, 0.4 parts by weight or more, 0.45 parts by weight or more, 0.5 parts by weight or more, 0.55 parts by weight or more, 0.6 parts by weight or more, 0.65 parts by weight or more, 0.7 parts by weight or more, 0.75 parts by weight or more, 0.8 parts by weight or more, 0.85 parts by weight or more, 0.9 parts by weight or more, 0.95 parts by weight or more, 1 part by weight or more, 1.2 parts by weight or more, 1.4 parts by weight or more, 1.6 parts by weight or more, 1.8 parts by weight or more, or 2 parts by weight or more, or may also be 2.4 parts by weight or less, 2.3 parts by weight or less, 2.2 parts by weight or less, 2.1 parts by weight or less, 2 parts by weight or less, 1.8 parts by weight or less, 1.6 parts by weight or less, 1.4 parts by weight or less, 1.2 parts by weight or less, 1 part by weight or less, 0.95 parts by weight or less, 0.9 parts by weight or less, 0.85 parts by weight or less, 0.8 parts by weight or less, 0.75 parts by weight or less, 0.7 parts by weight or less, 0.65 parts by weight or less, 0.6 parts by weight or less, 0.55 parts by weight or less, 0.5 parts by weight or less, 0.45 parts by weight or less, 0.4 parts by weight or less, 0.35 parts by weight or less, or 0.3 parts by weight or less or so.

The ink of the present application may comprise other components in addition to the above components. For example, the ink may comprise a solvent component for dispersing the polymer binder or surfactant, and the like.

As the solvent component, a known solvent component applied to the ink may be applied without any particular limitation.

In one example, a compound of Formula 1 below may be applied as the solvent component, so that in the present application, suitable flow characteristics (viscosity, thixotropy, etc.) may be secured, the evaporation rate in the drying and/or curing process of the ink may be controlled to an appropriate level, and the solid content movement and surface tension may be controlled to an appropriate level.

[Formula 1]

In Formula 1, $R_1$ is a hydrogen atom, an alkyl group or an alkylcarbonyl group, $L_1$ is an alkylene group, $R_2$ is an alkyl group or a hydrogen atom, and n is a number within a range of 1 to 10.

In another example, $R_1$ in Formula 1 may be a hydrogen atom; an alkyl group with 1 to 20 carbon atoms, 1 to 16 carbon atoms, 1 to 12 carbon atoms, 1 to 8 carbon atoms, or 1 to 4 carbon atoms; or an alkylcarbonyl group having an alkyl group with 1 to 20 carbon atoms, 1 to 16 carbon atoms, 1 to 12 carbon atoms, 1 to 8 carbon atoms, or 1 to 4 carbon atoms. Here, the alkyl group may be linear, branched, or cyclic, which may also optionally be substituted by one or more substituents.

In another example, $L_1$ in Formula 1 may be an alkylene group with 1 to 20 carbon atoms, 1 to 16 carbon atoms, 1 to 12 carbon atoms, 1 to 8 carbon atoms, or 1 to 4 carbon atoms. The alkylene group may be linear, branched, or cyclic, which may also optionally be substituted by one or more substituents.

In another example, $R_2$ in Formula 1 may be a hydrogen atom; or an alkyl group with 1 to 20 carbon atoms, 1 to 16 carbon atoms, 1 to 12 carbon atoms, 1 to 8 carbon atoms, or 1 to 4 carbon atoms. The alkyl group may be linear, branched, or cyclic, which may also be optionally substituted by one or more substituents.

In another example, n in Formula 1 may be 9 or less, 8 or less, 7 or less, 6 or less, 5 or less, 4 or less, 3 or less, or 2 or less.

The compound of such a structure can be combined with the polymer and the fluorine-based surfactant to secure the desired properties of the ink more effectively.

The compound of Formula 1 as above may be included in the ink in a ratio of 100 to 300 parts by weight relative to 100 parts by weight of the polymer binder. In another example, the ratio may be 110 parts by weight or more, 120 parts by weight or more, 130 parts by weight or more, 140 parts by weight or more, 150 parts by weight or more, 160 parts by weight or more, 170 parts by weight or more, 180 parts by weight or more, 190 parts by weight or more, 200 parts by weight or more, 210 parts by weight or more, 220 parts by weight or more, 230 parts by weight or more, or 240 parts by weight or more, or may also be 290 parts by weight or less, 280 parts by weight or less, 270 parts by weight or less, 260 parts by weight or less, 250 parts by weight or less, 240 parts by weight or less, 230 parts by weight or less, 220 parts by weight or less, 210 parts by weight or less, 200 parts by weight or less, 190 parts by weight or less, 180 parts by weight or less, 170 parts by weight or less, 160 parts by weight or less, 150 parts by weight or less, 140 parts by weight or less, 130 parts by weight or less, 120 parts by weight or less, or 110 parts by weight or less or so.

In order to secure proper physical properties, the ratio of the compound of Formula 1 in the ink may be adjusted to less than 70 weight %. In another example, this ratio may be 69 weight % or less, 68 weight % or less, 67 weight % or less, 66 weight % or less, 65 weight % or less, 64 weight % or less, 63 weight % or less, 62 weight % or less, 61 weight % or less, or 60 weight % or less, or may also be 30 weight % or more, 31 weight % or more, 32 weight % or more, 33 weight % or more, 34 weight % or more, 35 weight % or more, 36 weight % or more, 37 weight % or more, 38 weight % or more or more, 39 weight % or more, 40 weight % or more, 41 weight % or more, 42 weight % or more, 43 weight % or more, 44 weight % or more, 45 weight % or more, 46 weight % or more, 47 weight % or more, 48 weight % or more or more, 49 weight % or more, or 50 weight % or more or so.

The ink may comprise a colorant or the like as an additional component.

The colorant is used in order to impart a desired optical density to the ink, which for example, may be applied in a ratio of 20 to 90 parts by weight relative to 100 parts by weight of the polymer binder, but this may be adjusted in consideration of the desired optical density. In order to properly secure the desired physical properties, the ratio may be further adjusted, for example, within the range of 25 parts by weight or more, 30 parts by weight or more, 35 parts by weight or more, 40 parts by weight or more, 45 parts by weight or more, 50 parts by weight or more, 55 parts by weight or more, 60 parts by weight or more, 65 parts by weight or more, 70 parts by weight or more, 75 parts by weight or more, or 80 parts by weight or more and/or within the range of 85 parts by weight or less, 80 parts by weight or less, 75 parts by weight or less, 70 parts by weight or less, 65 parts by weight or less, 60 parts by weight or less, 55 parts by weight or less, 50 parts by weight or less, 45 parts by weight or less, or 40 parts by weight or less.

As the colorant, one or more types of pigments, dyes, or mixtures thereof may be used, and the type is not particularly limited if the necessary color can be expressed.

In one example, a black pigment and/or dye may be used as the colorant, and for example, carbon black, graphite, metal oxide and/or organic black pigment, and the like may be used.

An example of carbon black may be exemplified by Cysto 5HIISAF-HS, Cysto KH, Cysto 3HHAF-HS, Cysto NH, Cysto 3M, Cysto 300HAFLS, Cysto 116HMMAF-HS, Cysto 116MAF, Cysto FMFEF-HS, Cysto SOFEF, Cysto VGPF, Cysto SVHSRF-HS and Cysto SSRF (Donghae Carbon Co., Ltd.); Diagram Black II, Diagram Black N339, Diagram Black SH, Diagram Black H, Diagram LH, Diagram HA, Diagram SF, Diagram N550M, Diagram M, Diagram E, Diagram G, Diagram R, Diagram N760M, Diagram LR, #2700, #2600, #2400, #2350, #2300, #2200, #1000, #980, #900, MCF88, #52, #50, #47, #45, #45L, #25, #CF9, #95, #3030, #3050, MA7, MA77, MA8, MA11, MA100, MA40, OIL7B, OIL9B, OIL11B, OIL30B and OIL31B (Mitsubishi Chemical Corporation); PRINTEX-U, PRINTEX-V, PRINTEX140U, PRINTEX-140V, PRINTEX-95, PRINTEX-85, PRINTEX-75, PRINTEX-55, PRINTEX-45, PRINTEX-300, PRINTEX35, PRINTEX-25, PRINTEX-200, PRINTEX-40, PRINTEX-30, PRINTEX-3, PRINTEX-A, SPECIAL BLACK-550, SPECIAL BLACK-350, SPECIAL BLACK-250, SPECIAL BLACK-100 and LAMP BLACK-101 (DEGUSSA); RAVEN-1100ULTRA, RAVEN1080ULTRA, RAVEN-1060ULTRA, RAVEN-1040, RAVEN-1035, RAVEN-1020, RAVEN-1000, RAVEN-890H, RAVEN-890, RAVEN-880ULTRA, RAVEN-860ULTRA, RAVEN-850, RAVEN-820, RAVEN-790ULTRA, RAVEN-780ULTRA, RAVEN-760ULTRA, RAVEN-520, RAVEN-500, RAVEN-460, RAVEN-450, RAVEN-430ULTRA, RAVEN-420, RAVEN-410, RAVEN-2500ULTRA, RAVEN-2000, RAVEN-1500, RAVEN-1255, RAVEN-1250, RAVEN-1200, RAVEN-1190ULTRA, and RAVEN-1170 (Colombia Carbon Co., Ltd.) or mixtures thereof, and the like, and the organic black pigment may be exemplified by aniline black, lactam black or perylene black series, and the like, without being limited thereto.

In addition to the components described above, the ink may further comprise a known additive applied to the ink, such as an antifoaming agent or a diluent, in an appropriate amount, within a range without impairing the desired physical properties.

The present application also relates to a printing method using the ink, and the printing method may be a screen-printing method.

If the ink of the present application is applied to the screen-printing method, a specific proceeding method is not particularly limited, and a known screen-printing method may be applied.

The screen-printing method is usually performed by a method of applying an ink on a printing plate on which a printed pattern manufactured in a mesh form is formed, placing the printing plate on a substrate to be printed, and then pushing the ink with a squeeze or the like.

Therefore, in one example, the screen-printing method may comprise a step of transferring the screen-printing ink to a substrate to be printed through a screen-printing plate.

In the above process, the transfer may be performed by a method of pushing the ink on the printing plate using a squeegee.

Specific conditions in this process are not particularly limited.

In one example, for proper printing, in the above process, for example, the squeegee angle may be controlled within a range of about 50 degrees to 180 degrees. In another example, the angle may be adjusted within the range of about 55 degrees or more, 60 degrees or more, 65 degrees or more, 70 degrees or more, 75 degrees or more, or 80 degrees or more and/or within the range of 175 degrees or less, 170 degrees or less, 165 degrees or less, 160 degrees or less, 155 degrees or less, 150 degrees or less, 145 degrees or less, 140 degrees or less, 135 degrees or less, 130 degrees or less, 125 degrees or less, 120 degrees or less, 115 degrees or less, 110 degrees or less, 105 degrees or less, 100 degrees or less, 95 degrees or less, 90 degrees or less, 85 degrees or less, or 80 degrees or less.

In addition, in the screen-printing, the printing speed may be controlled within a range of about 20 to 200 mm/sec. In another example, the speed may be further adjusted within the range of about 30 mm/sec or more, 40 mm/sec or more, 50 mm/sec or more, 60 mm/sec or more, 70 mm/sec or more, 80 mm/sec or more, 90 mm/sec or more, or 100 mm/sec or more and/or within the range of 190 mm/sec or less, 180 mm/sec or less, 170 mm/sec or less, 160 mm/sec or less, 150 mm/sec or less, 140 mm/sec or less, 130 mm/sec or less, 120 mm/sec or less, 110 mm/sec or less, 100 mm/sec or less, 90 mm/sec or less, 80 mm/sec or less, 70 mm/sec or less, 60 mm/sec or less, 50 mm/sec or less, or 40 mm/sec or less.

For formation of a desired printed pattern, the printing speed may be controlled according to the amount of the surfactant in the ink. For example, as the amount of the surfactant in the ink increases, the printing speed may also be controlled to be slower.

For example, the printing speed may be controlled so that an S value (unit: parts by weight mm/sec) of Equation 1 below is in a range of 25 to 110.

$$S = R \times W \qquad \text{[Equation 1]}$$

In Equation 1, R is the printing speed (unit: mm/sec), and W is parts by weight of the surfactant relative to 100 parts by weight of the polymer binder in the ink.

In another example, the S value may also be further controlled within the range of 26 or more, 27 or more, 28 or more, or 29 or more and/or within the range of 109 or less, 108 or less, 107 or less, 106 or less, 105 or less, 104 or less, 103 or less, 102 or less, 101 or less, 100 or less, 99 or less, 98 or less, 97 or less, 96 or less, 95 or less, 94 or less, 93 or less, 92 or less, 91 or less, 90 or less, 89 or less, 88 or less, 87 or less, 86 or less, 85 or less, 84 or less, 83 or less, 82 or less, 81 or less, or 80 or less.

In the printing method, a process of drying the transferred ink after the transfer process may be further performed, and in this process, the ink may be cured.

Such drying conditions are not particularly limited, which may be controlled through the composition of the ink used. For example, the drying may be performed at a temperature within the range of 60° C. to 200° C. for a time within the range of about 5 minutes to 2 hours.

When the screen-printing is performed in two or more colors, the drying may be performed after printing before the additional printing proceeds, may also be performed once again after final printing, and may also be performed at once in the final step after printing in two or more colors.

The screen-printing may be performed as a single-color print, or may also be performed in multiple stages of two or more colors. In the present application, even in the case of a pattern formed by performing the printing in two or more colors as described above, printed pattern having no edge top defect, and having excellent thickness uniformity and straightness can be formed. In addition, the printed pattern formed through the above process exhibits excellent adhesion and durability to the substrate, and may exhibit the above characteristics even on the substrate applied to repeated folding.

In one example, the screen-printing method may also be a bezel forming method, and in this case, a bezel pattern may be formed by the transfer. Even in this case, the specific steps and conditions of the bezel forming method are the same as in the screen-printing method.

The present application can provide a printed board comprising a printed pattern and/or a printed line having excellent thickness uniformity and straightness, no edge top defect, and no damage even when exposed to repeated folding, and can provide an ink capable of forming the printed pattern and/or printed line, and a printing method using the same.

BRIEF DESCRIPTION OF DRAWINGS

FIG. 1 is a diagram illustrating an exemplary bezel pattern of an embodiment of the present disclosure.

FIG. 2 is a diagram showing a laminated structure of a printed board according to an embodiment of the present disclosure.

FIG. 3 is a diagram showing a sample specimen for measuring a thickness of a printed pattern.

FIG. 4 is a graph showing an example of a thickness profile.

FIG. 5 is a diagram showing a folded portion in a folding test.

FIG. 6 is an optical microscope image of a printed pattern after a folding test.

DESCRIPTION OF REFERENCE NUMERALS

100: cover substrate
200: pressure-sensitive adhesive layer or adhesive layer
300: printed pattern
400: substrate

DETAILED DESCRIPTION

Hereinafter, the present application will be described in detail through Examples, but the scope of the present application is not limited by Examples below.

Method of Measuring Print Thickness and Edge Top

A thickness of a printed pattern as screen-printed was evaluated using Alphastep Profiler (KLA Tencor D-300) (Conditions: Contact force 5 µg, Scan speed: 100 µm/sec). As shown in FIG. 3, a polymer film (400) comprising a screen-printed pattern (300) was laminated on a glass (10) using the OCA (20) so that distortion of the printed pattern thickness did not occur, and then the thickness was evaluated in the longitudinal direction of the printed pattern.

When the thickness of the printed pattern is measured in the above manner, thickness data as shown in FIG. 4 can be obtained (in FIG. 4, the x-axis is the measurement position of the thickness, and the y-axis is the thickness). In the data, the average value of the central thickness region (2000) excluding the left and right sides was designated as the printing thickness, and the thickness uniformity (the difference between the maximum thickness and the minimum thickness) through the difference between the maximum and minimum values in the central thickness region (2000) was confirmed.

In addition, the occurrence of edge top defects was evaluated by confirming the absolute value (edge top deviation) of the difference between the higher height (the height of 1000 in FIG. 4) of the heights of the left and right sides in the thickness shape data and the average value as the printing thickness.

The average value of the central thickness region (2000), the thickness uniformity, and the edge top deviation were evaluated for the four printed lines (printed line from I to II, printed line from II to III, printed line from III to IV, and printed line from IV to I in FIG. 1), respectively. As a result, the average value of the central thickness region (2000) was described as the average value of the results for the four printed lines, and the thickness uniformity and edge top deviation were described as the worst results among the results for the four printed lines in the case of Examples, and as the best results in the case of Comparative Examples.

Straightness Evaluation

The straightness of the printed pattern was quantified by analyzing an image measured with an optical microscope. First, the image is binary-imaged by setting the printed pattern area to Black, and setting other areas (background areas) to White, and a horizontal line with Black:White of 1:1 is designated as a center line. Subsequently, the distance to the printed area (black) farthest to the outside of the printed area based on the center line was taken as (+), the distance to the unprinted area (white) farthest from the inside of the printed area based on the center line was taken as (−), and then the average values of (+) and (−) of two outside and inside parts of the edge area in the printed area were recorded as straightness.

The straightness was evaluated for the four printed lines (printed line from I to II, printed line from II to III, printed line from III to IV, and printed line from IV to I in FIG. 1), respectively, and described as the worst results among the results for the four printed lines in the case of Examples, and as the best results in the case of Comparative Examples.

Evaluation of Optical Density

The optical density was evaluated using a known optical density meter (341C manufactured by X-rite).

Folding Characteristics

Folding characteristics were evaluated by confirming the occurrence of cracks with the naked eye and optical microscope after folding the polymer film, on which the bezel printed pattern was printed as in FIG. 5, 200,000 times so that the area indicated by F in FIG. 5 was folded. The folding was performed to be folded at a rate of 1 Hz (once per second) with a curvature of 2.5R.

Example 1

A screen-printing ink was prepared by mixing FR260C-1 (manufactured by Asahi Chemical) as an ink comprising a polyester resin binder, and F-571 (manufactured by DIC) as a fluorine-based surfactant.

The FR260C-1 ink is an ink comprising 25 to 35 weight % of a polyester binder, comprising 50 to 60 weight % of diethylene glycol monoethyl ether acetate, comprising 10 to 20 weight % of carbon powder (CAS No. 1333-86-4), 2 weight % or less of an anti-foaming agent, and comprising 2 weight % or less of other additives, and the F-571 is a fluorine-based nonionic surfactant.

The ink was prepared by mixing the FR260C-1 (manufactured by Asahi Chemical) ink and the fluorine-based surfactant (F-571 (manufactured by DIC)) in a weight ratio of 100:0.5 (FR260C-1:F-571). Since the FR260C-1 comprises 25 to 35 weight % of the polyester binder, the weight ratio of the surfactant to 100 parts by weight of the binder is about 1.43 to 2 parts by weight or so.

The bezel was printed on a f-PET film (New polyester film, manufactured by MCC (Mitsubishi Chemical), thickness: 50 μm) as a polymer film through screen-printing using the prepared ink. The bezel printed pattern was printed as shown in FIG. 1.

As the screen-printing plate, a screen-printing plate of Poly catex 460 mesh was used. A pattern was formed on the screen-printing plate so that the bezel pattern as shown in FIG. 1 could be transferred to the polymer film as the film to be printed, where the printing width of the bezel (W in FIG. 1) was about 2 mm or so. The printing plate was placed on the polymer film to be printed, the prepared ink was applied on the printing plate, and then the ink was transferred on the polymer film by applying a pressure thereto. In this process, the squeegee angle was adjusted to about 80 degrees, the interval between the printing plate touched by the squeegee and the polymer film as a base material was about 3 mm or so, and the printing speed was controlled to about 40 mm/sec. After the above printing, the printed pattern was maintained at 100° C. for about 14 minutes and dried (single color printing). Thereafter, the same additional printing was performed on the dried printed pattern, and it was again maintained at 100° C. for about 14 minutes (two-color printing). After the two-color printing, the printing thickness was set to about 3.7 μm or so. Thereafter, a cover window (thickness: about 70 μm) was laminated using a known OCA (optical clear adhesive) with a thickness of 25 μm or so to manufacture a laminate comprising the cover window (100), the OCA (200), the bezel printed pattern (300) and the polymer film (400), as shown in FIG. 2.

Example 2

Upon preparing a screen-printing ink, the ink was prepared by setting the weight ratio of the FR260C-1 (manufactured by Asahi chemical) ink and the fluorine-based surfactant (F-571) to 100:0.1 (FR260C-1:F-571). Since the FR260C-1 comprises 25 to 35 weight % of the polyester binder, the weight ratio of the surfactant to 100 parts by weight of the binder is about 0.29 to 0.4 parts by weight or so.

Thereafter, the screen-printing was performed in the same manner as in Example 1, and the structure as shown in FIG. 2 was prepared, but at this time, the printing speed was adjusted to about 100 mm/sec or so, and the printing thickness was set in a level of about 4.7 μm.

Comparative Example 1

The screen-printing was performed in the same manner as in Example 1 using only FR260C-1 (manufactured by Asahi chemical) ink without mixing the fluorine-based surfactant, and the structure as in FIG. 2 was prepared.

Comparative Example 2

The screen-printing was performed in the same manner as in Example 1 except for using the ink prepared by mixing the FR260C-1 (manufactured by Asahi Chemical) ink and the fluorine-based surfactant (F-571) in a weight ratio of 100:0.01 (FR260C-1:F-571), and the structure of FIG. 2 was prepared. Since the FR260C-1 comprises 25 to 35 weight % of the polyester binder, the weight ratio of the surfactant to 100 parts by weight of the binder is about 0.029 to 0.04 parts by weight or so.

Comparative Example 3

The screen-printing was performed in the same manner as in Example 1 except for using the ink prepared by mixing the FR260C-1 (manufactured by Asahi Chemical) ink and the fluorine-based surfactant (F-571) in a weight ratio of 100:0.05 (FR260C-1:F-571), and the structure of FIG. 2 was prepared. Since the FR260C-1 comprises 25 to 35 weight % of the polyester binder, the weight ratio of the surfactant to 100 parts by weight of the binder is about 0.14 to 0.2 parts by weight or so.

Comparative Example 4

The screen-printing was performed in the same manner as in Example 1 except for using the ink prepared by mixing the FR260C-1 (manufactured by Asahi Chemical) ink and the fluorine-based surfactant (F-571) in a weight ratio of 100:1 (FR260C-1:F-571), and the structure of FIG. 2 was prepared. Since the FR260C-1 comprises 25 to 35 weight % of the polyester binder, the weight ratio of the surfactant to 100 parts by weight of the binder is about 2.9 to 4 parts by weight or so.

Comparative Example 5

The screen-printing was performed in the same manner as in Example 2 using only the FR260C-1 (manufactured by Asahi chemical) ink without mixing the fluorine-based surfactant, and the structure as in FIG. 2 was prepared.

Comparative Example 6

The screen-printing was performed in the same manner as in Example 2 except for using the ink prepared by mixing the FR260C-1 (manufactured by Asahi Chemical) ink and the fluorine-based surfactant (F-571) in a weight ratio of 100:0.01 (FR260C-1:F-571), and the structure of FIG. 2 was prepared. Since the FR260C-1 comprises 25 to 35 weight % of the polyester binder, the weight ratio of the surfactant to 100 parts by weight of the binder is about 0.029 to 0.04 parts by weight or so.

Comparative Example 7

The screen-printing was performed in the same manner as in Example 2 except for using the ink prepared by mixing the FR260C-1 (manufactured by Asahi Chemical) ink and the fluorine-based surfactant (F-571) in a weight ratio of 100:0.05 (FR260C-1:F-571), and the structure of FIG. 2 was prepared. Since the FR260C-1 comprises 25 to 35 weight % of the polyester binder, the weight ratio of the surfactant to 100 parts by weight of the binder is about 0.14 to 0.2 parts by weight or so.

Comparative Example 8

The screen-printing was performed in the same manner as in Example 2 except for using the ink prepared by mixing the FR260C-1 (manufactured by Asahi Chemical) ink and the fluorine-based surfactant (F-571) in a weight ratio of 100:1 (FR260C-1:F-571), and the structure of FIG. 2 was prepared. Since the FR260C-1 comprises 25 to 35 weight % of the polyester binder, the weight ratio of the surfactant to 100 parts by weight of the binder is about 2.9 to 4 parts by weight or so.

The results of Examples and Comparative Examples were summarized and described in Tables 1, 2 and 3 below.

TABLE 1

| | Examples | |
|---|---|---|
| | 1 | 2 |
| Printing thickness (μm) | 3.72 ± 0.16 | 4.67 ± 0.16 |
| Thickness uniformity (μm) | 0.43 | 0.45 |
| Edge top deviation (μm) | 0.38 | 0.51 |
| Optical density | 5.93 | 6.06 |
| Straightness (μm) | 25.3 | 28.7 |

Thickness uniformity: difference between the maximum thickness and the minimum thickness in the printed pattern

TABLE 2

| | Comparative Examples | | | |
|---|---|---|---|---|
| | 1 | 2 | 3 | 4 |
| Printing thickness (μm) | 3.89 ± 0.19 | 3.78 ± 0.16 | 3.82 ± 0.21 | 3.82 ± 0.19 |
| Thickness uniformity(μm) | 0.59 | 0.63 | 0.58 | 0.64 |
| Edge top deviation (μm) | 0.75 | 0.61 | 0.62 | 0.56 |
| Optical density | 5.95 | 5.94 | 5.94 | 5.63 |
| Straightness (μm) | 66.4 | 52.3 | 32.3 | 27.7 |

Thickness uniformity: difference between the maximum thickness and the minimum thickness in the printed pattern

TABLE 3

| | Comparative Examples | | | |
|---|---|---|---|---|
| | 5 | 6 | 7 | 8 |
| Printing thickness(μm) | 4.64 ± 0.26 | 4.62 ± 0.21 | 4.60 ± 0.16 | 4.55 ± 0.28 |
| Thickness uniformity(μm) | 0.57 | 0.54 | 0.54 | 0.66 |
| Edge top deviation (μm) | 0.69 | 0.72 | 0.68 | 0.74 |
| Optical density | 6.18 | 6.19 | 6.21 | 5.93 |
| Straightness (μm) | 97.1 | 94.5 | 39.7 | 30.5 |

Thickness uniformity: difference between the maximum thickness and the minimum thickness in the printed pattern As summarized in Tables 1 to 3, in the case of Examples, the bezel pattern was stably printed to have no edge top defect and excellent straightness while having thickness uniformity, but in the case of Comparative Examples, all of thickness uniformity, edge top characteristics, and straightness were not secured, or at least one of them was poor.

Test Example 1. Evaluation of Folding Durability

A polymer film having a bezel printed pattern as screen-printed according to Example 1 was applied to the folding test. FIG. 6 is an optical micrograph image of the printed pattern after the folding test, and it can be confirmed therefrom that the printed pattern is stably maintained without damage even after folding. In FIG. 6, the reference numeral 3000 is a printed area in which a printed pattern exists, and the reference numeral 4000 is an unprinted area in which a printed pattern does not exist.

The invention claimed is:

1. A printed board comprising:
   a substrate; and
   a printed pattern formed on the substrate,
   wherein the printed pattern comprises one or more printed lines,
   wherein the printed line comprises a polymer binder, a colorant, and a fluorine-based surfactant,
   wherein the colorant is a black pigment or dye, or mixtures thereof,
   wherein the colorant is comprised in a ratio of 25 to 85 parts by weight relative to 100 parts by weight of the polymer binder,
   wherein in the printed line, the polymer binder is comprised 50 to 70 parts by weight relative to 100 parts by weight of the printed line, and
   wherein the printed line has thickness uniformity, a difference between the maximum thickness and the minimum thickness, of 0.6 μm or less and an edge top deviation, an absolute value of a difference between an average thickness of the printed line and thickness of an edge portion of the printed line having the average thickness, of 0.55 μm or less.

2. The printed board according to claim 1, wherein the printed line has a thickness in a range of 0.5 μm to 10 μm.

3. The printed board according to claim 1, wherein the printed line has straightness of 50 μm or less,
   wherein the straightness is obtained by analyzing an image measured with an optical microscope.

4. The printed board according to claim 1, wherein the printed pattern is a bezel pattern.

5. The printed board according to claim 1, wherein in the printed line, the fluorine-based surfactant is comprised in an amount of 0.25 to 2.5 parts by weight relative to 100 parts by weight of the polymer binder.

* * * * *